(12) United States Patent
Dong et al.

(10) Patent No.: US 11,657,193 B2
(45) Date of Patent: May 23, 2023

(54) MECHANICS CALCULATION METHOD OF DRILL BIT TOOTH CONSIDERING ROCK DYNAMIC STRENGTH AND MIXED CRUSHING MODE

(71) Applicant: SOUTHWEST PETROLEUM UNIVERSITY, Chengdu (CN)

(72) Inventors: Guangjian Dong, Chengdu (CN); Ping Chen, Chengdu (CN); Jianhong Fu, Chengdu (CN); Yingxin Yang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/866,461

(22) Filed: Jul. 15, 2022

(65) Prior Publication Data
US 2022/0374560 A1 Nov. 24, 2022

(30) Foreign Application Priority Data
Jul. 15, 2021 (CN) .......................... 202110797870.6

(51) Int. Cl.
*E21B 10/43* (2006.01)
*G06F 30/17* (2020.01)
*E21B 12/02* (2006.01)
*G06F 30/20* (2020.01)
*G01N 3/08* (2006.01)
*G01N 3/24* (2006.01)
*G06F 119/14* (2020.01)

(52) U.S. Cl.
CPC .............. *G06F 30/17* (2020.01); *E21B 10/43* (2013.01); *E21B 12/02* (2013.01); *G01N 3/08* (2013.01); *G01N 3/24* (2013.01); *G06F 30/20* (2020.01); *E21B 2200/20* (2020.05); *G06F 2119/14* (2020.01)

(58) Field of Classification Search
CPC ...... G06F 30/17; G06F 30/20; G06F 2119/14; E21B 10/43; E21B 12/02; E21B 2200/20; G01N 3/08; G01N 3/24
USPC .......................................................... 703/10
See application file for complete search history.

(56) References Cited

PUBLICATIONS

Poletto, Flavio, and Cinzia Bellezza. "Drill-bit displacement-source model: Source performance and drilling parameters." Geophysics 71.5 (2006). pp. F121-F129. (Year: 2006).*

(Continued)

*Primary Examiner* — John E Johansen

(57) ABSTRACT

The invention discloses a mechanics calculation method of drill bit tooth considering rock dynamic strength and mixed crushing mode, including: Step S1: selecting a target drill bit tooth and a target rock, and determining a type of target drill bit tooth, a geometry of the target drill bit tooth, a rock type and rock parameters of the target rock; Step S2: calculating a horizontal cutting force of the target drill bit tooth according to a horizontal cutting mechanics calculation method of drill bit tooth; Step S3: calculating a vertical penetration force of the target drill bit tooth according to a vertical penetration mechanics calculation method of drill bit tooth; Step S4: calculating a resultant force experienced by the target drill bit tooth according to a resultant force calculation method of drill bit tooth. The invention provides a calculation method for accurately obtaining drill bit tooth mechanics under different working conditions.

8 Claims, 2 Drawing Sheets

(56) References Cited

PUBLICATIONS

Feng, "Research on the law of rock damage under the action of PDC teeth", China Excellent Ph.D. and Master's Thesis Full Text Database Engineering Stalk Science and Technology 1 Series, Jul. 15, 2019, No. 7, p. B019-204.

* cited by examiner

MECHANICS CALCULATION METHOD OF DRILL BIT TOOTH CONSIDERING ROCK DYNAMIC STRENGTH AND MIXED CRUSHING MODE

FIELD OF THE INVENTION

The present invention relates to the technical field of oil and gas well engineering, in particular to a mechanics calculation method of drill bit tooth considering rock dynamic strength and mixed crushing mode.

BACKGROUND OF THE INVENTION

In the field of deep drilling, crushing rocks with the drill bit plays a crucial role in improving rate of penetration (ROP) and rock excavation efficiency. In the process of rock crushing, the target drill bit tooth mechanics of interactions between the drill bit and the target rock has always been a core hot issue. Under the interactions between the drill bit and the target rock, the target drill bit tooth mechanics can provide meaningful guidance for drill bit design, drill tool selection, new drill tool development, and improving ROP.

Crushing rocks with the target drill bit tooth is a complicated process. The calculation methods for the force of drill bit tooth are divided into two categories. One is the numerical simulation method, mainly including finite element method, finite difference method, discrete element method, digital simulation method, etc., but numerical solutions are computationally slower than analytical solutions. The analytical solutions mainly include the following: (1) based on the tensile fracture theory, a classical wedge-shaped drill bit tooth-rock interaction mechanics analytical solution model is established; (2) considering shear failure theory, friction between cutting tooth and rocks and rock pore pressure, an analytical model of cutting tooth-rock interaction is established; (3) considering that the crushing force of drill bit tooth is transmitted through the dense core, a mechanical model of wedge-shaped tooth intrusion is established; (4) based on cutting experimental observations, considering compaction core and tensile failure modes, a mechanical model of drill bit tooth-rock interaction is established.

It is not difficult to find that crushing rocks with the target drill bit tooth is a complex stress process, including tensile failure, compression failure and shear failure, and in the process of crushing rocks with the target drill bit tooth, the target rock are subjected to dynamic loads while the rock strength will change under different dynamic loads. However, the above-mentioned mechanical models and calculation methods for drill-rock interaction mainly consider single failure mode, single crushing strength mode, static or quasi-static strength mechanics theory without comprehensive consideration of cutting speed, dynamic strength and mixed crushing mode, so that the real dynamic force characteristics of crushing rocks with the target drill bit tooth cannot be considered. Currently, the mechanical calculation method for the target drill bit tooth considering rock dynamic strength, mixed fracture mode, drill bit tooth movement speed, drill bit tooth shape and rock strain rate is rarely involved.

SUMMARY OF THE INVENTION

The objectives of the present invention is to overcome the shortcomings of the prior arts, and to provide a drill bit tooth mechanics calculation method considering rock dynamic strength and mixed crushing mode. The calculation method includes steps of: (1) selecting a target drill bit tooth and a target rock, and determining a type of the target drill bit tooth, a geometry of the target drill bit tooth, a rock type and rock parameters of the target rock; (2) calculating a horizontal cutting force of the target drill bit tooth according to a horizontal cutting mechanics calculation method of drill bit tooth; (3) calculating a vertical penetration force of the target drill bit tooth according to a vertical penetration mechanics calculation method of drill bit tooth; (4) calculating a resultant force experienced by the target drill bit tooth according to a resultant force calculation method of drill bit tooth. A calculation method that can accurately and quickly obtain drill bit tooth mechanics under different working conditions is provided.

In order to achieve the above-mentioned objectives of the invention, the following technical schemes are adopted.

A mechanics calculation method of drill bit tooth considering rock dynamic strength and mixed crushing mode includes the following steps:

Step S1: selecting a target drill bit tooth and a target rock, and determining a type of the target drill bit tooth, a geometry of the target drill bit tooth, a rock type and rock parameters of the target rock;

Step S2: using a processor for calculating a horizontal cutting force of the target drill bit tooth according to a horizontal cutting mechanics calculation method of drill bit tooth;

Step S3: using the processor for calculating a vertical penetration force of the target drill bit tooth according to a vertical penetration mechanics calculation method of drill bit tooth;

Step S4: using the processor for calculating a resultant force experienced by the target drill bit tooth according to a resultant force calculation method of drill bit tooth.

In the Step S1, the type of the target drill bit tooth includes a cylindrical drill bit tooth and a wedge drill bit tooth; the geometry of the target drill bit tooth comprises a diameter of the cylindrical drill bit tooth, a height of the cylindrical drill bit tooth, a height of the wedge drill bit tooth, and an angle of the wedge drill bit tooth; the rock parameters comprise a static rock uniaxial compressive strength, a static rock tensile strength, a static rock shear strength, a rock internal friction angle, a dynamic rock uniaxial compressive strength, a dynamic rock tensile strength, and a dynamic rock shear strength.

In the Step S2, the horizontal cutting mechanics calculation method of drill bit tooth is determined according to the following formula:

$$F_c = F \times D \times \frac{A}{A \times E + C} + B$$

Wherein:

$A = \cos(\gamma + \omega) \times [H + I + J - K]$;

$B = \dfrac{2\sigma_{sd} w d \sin\omega \cos\varphi \cos(\beta + \gamma)}{1 - \sin(\varphi + \gamma + \beta)}$;

$C = \sin\omega \dfrac{\cos(\gamma + \omega) + G}{M}$;

$D = \dfrac{\sin\left(\dfrac{\pi}{2} - \gamma\right)}{\sin\left(\dfrac{\pi}{2} - \gamma - \omega\right)}$;

-continued $$E = \frac{\sin\omega}{\cos(\gamma+\omega)};$$

$$F = \sigma_{ucd}wd;$$

$$G = \sqrt{\cos^2(\gamma+\omega) + 4N\sin^2\left(\frac{\pi}{4} - \frac{\gamma+\omega}{2}\right) + 4\sin^4\left(\frac{\pi}{4} + \frac{\gamma+\omega}{2}\right)};$$

$$H = -\frac{\cos(\gamma+\omega)}{4\sin^2\left(\frac{\pi}{4} - \frac{\gamma+\omega}{2}\right) + 4N};$$

$$I = \frac{\sqrt{N+1}}{2\sin\left(\frac{\pi}{4} - \frac{\gamma+\omega}{2}\right)};$$

$$J = \frac{1}{2}\cot\left(\frac{\pi}{4} - \frac{\gamma+\omega}{2}\right);$$

$$K = \frac{G}{L};$$

$$L = 4\sin^2\left(\frac{\pi}{4} - \frac{\gamma+\omega}{2}\right) + 4N;$$

$$M = 2\sin^2\left(\frac{\pi}{4} + \frac{\gamma+\omega}{2}\right) + 2N;$$

$$N = \frac{\sigma_{td}}{\sigma_{ucd}};$$

wherein $F_c$ is the horizontal cutting force of the target drill bit tooth with a unit of N; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\gamma$ is the caster angle of the target drill bit tooth with a unit of rad; $\omega$ is the scrap forming-compaction transition angle with a unit of rad; $\beta$ is the average friction angle between contact surfaces of the target drill bit tooth and the target rock with a unit of rad; $\varphi$ is the rock internal friction angle, and w is the target drill bit tooth penetration equivalent width with a unit of mm; d is the cutting depth with a unit of mm.

In the Step S3, the vertical penetration mechanics calculation method of drill bit tooth is determined according to the following formula:

$$F_t = \tan(\gamma+\beta)F_c$$

wherein $F_t$ is the vertical penetration force of the target drill bit tooth with a unit of N; $\gamma$ is the caster angle of the target drill bit tooth with a unit of rad; $\beta$ is the average friction angle between contact surfaces of the target drill bit tooth and the target rock with a unit of rad; $F_c$ is the horizontal cutting force of the target drill bit tooth with a unit of N.

In the Step S4, the resultant force calculation method of drill bit tooth is determined according to the following formula:

$$F_{ct} = \sqrt{\left(F \times D \times \frac{A}{A \times E + C} + B\right)^2 + (\tan(\gamma+\beta)F_c)^2}$$

wherein:

$$A = \cos(\gamma+\omega) \times [H + I + J - K];$$

$$B = \frac{2\sigma_{sd}wd\sin\omega\cos\varphi\cos(\beta+\gamma)}{1 - \sin(\varphi+\gamma+\beta)};$$

$$C = \sin\omega\frac{\cos(\gamma+\omega) + G}{M};$$

$$D = \frac{\sin\left(\frac{\pi}{2} - \gamma\right)}{\sin\left(\frac{\pi}{2} - \gamma - \omega\right)};$$

$$E = \frac{\sin\omega}{\cos(\gamma+\omega)};$$

$$F = \sigma_{ucd}wd;$$

$$G = \sqrt{\cos^2(\gamma+\omega) + 4N\sin^2\left(\frac{\pi}{4} - \frac{\gamma+\omega}{2}\right) + 4\sin^4\left(\frac{\pi}{4} + \frac{\gamma+\omega}{2}\right)};$$

$$H = -\frac{\cos(\gamma+\omega)}{4\sin^2\left(\frac{\pi}{4} - \frac{\gamma+\omega}{2}\right) + 4N};$$

$$I = \frac{\sqrt{N+1}}{2\sin\left(\frac{\pi}{4} - \frac{\gamma+\omega}{2}\right)};$$

$$J = \frac{1}{2}\cot\left(\frac{\pi}{4} - \frac{\gamma+\omega}{2}\right);$$

$$K = \frac{G}{L};$$

$$L = 4\sin^2\left(\frac{\pi}{4} - \frac{\gamma+\omega}{2}\right) + 4N;$$

$$M = 2\sin^2\left(\frac{\pi}{4} + \frac{\gamma+\omega}{2}\right) + 2N;$$

$$N = \frac{\sigma_{td}}{\sigma_{ucd}};$$

wherein $F_c$ is the horizontal cutting force of the target drill bit tooth with a unit of N; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\gamma$ is the caster angle of the target drill bit tooth with a unit of rad; $\omega$ is the scrap forming-compaction transition angle with a unit of rad; $\beta$ is the average friction angle between contact surfaces of the target drill bit tooth and the target rock with a unit of rad; $\varphi$ is the rock internal friction angle, and w is the target drill bit tooth penetration equivalent width with a unit of mm; d is the cutting depth with a unit of mm; $F_{ct}$ is the resultant force of the target drill bit tooth with a unit of N.

The static rock uniaxial compressive strength, the static rock tensile strength, the static rock shear strength and the rock internal friction angle of the rock parameters are measured by field logging data or laboratory rock mechanics experiments; the dynamic rock uniaxial compressive strength, the dynamic rock tensile strength and the dynamic rock shear strength of the rock parameters are obtained according to steps of:

Step S11: using a split Hopkinson pressure bar (SHPB) for measuring the dynamic rock uniaxial compressive strength by SHPB rock mechanics experiments, and using the processor for establishing a relationship among the dynamic rock uniaxial compressive strength, the static rock uniaxial compressive strength and a dynamic loading strain rate of the load, which is expressed as follows:

$$\frac{\sigma_{ucd}}{\sigma_{uc}} = \begin{cases} a_1 \dot{\varepsilon}^{1/(1+n_c)} & (\dot{\varepsilon} < \dot{\varepsilon}^*) \\ a_2 \dot{\varepsilon}^{1/n} & (\dot{\varepsilon} \geq \dot{\varepsilon}^*) \end{cases}$$

Step S12: using the SHPB for measuring the dynamic rock tensile strength by the SHPB rock mechanics experiments, the dynamic rock tensile strength being the radial fracturing indirect tensile strength, and using the processor for establishing a relationship among the dynamic rock tensile strength, the static rock tensile strength and the dynamic loading strain rate of the load, which is expressed as follows:

$$\frac{\sigma_{td}}{\sigma_t} = \begin{cases} b_1 \dot{\varepsilon}^{1/(1+n_c)} & (\dot{\varepsilon} < \dot{\varepsilon}^*) \\ b_2 \dot{\varepsilon}^{1/n} & (\dot{\varepsilon} \geq \dot{\varepsilon}^*) \end{cases}$$

Step S13: using the SHPB for measuring the dynamic rock shear strength by SHPB rock mechanics experiments, and using the processor for establishing a relationship among the dynamic rock shear strength, the static rock shear strength and the dynamic loading strain rate of the load, which is expressed as follows:

$$\frac{\sigma_{sd}}{\sigma_s} = \begin{cases} c_1 \dot{\varepsilon}^{1/(1+n_c)} & (\dot{\varepsilon} < \dot{\varepsilon}^*) \\ c_2 \dot{\varepsilon}^{1/n} & (\dot{\varepsilon} \geq \dot{\varepsilon}^*) \end{cases}$$

wherein $a_1$, $a_2$, $b_1$, $b_2$, $c_1$, $c_2$, n, $n_c$ are the fit coefficients, dimensionless; $\sigma_{uc}$ is the static rock uniaxial compressive strength with a unit of MPa; $\sigma_t$ is the static rock tensile strength with a unit of MPa; $\sigma_s$ is the static rock shear strength with a unit of MPa; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\dot{\varepsilon}$ is the dynamic loading strain rate of the load with a unit of $s^{-1}$, and $\dot{\varepsilon}^*$ is the dynamic loading critical strain rate of the load with a unit of $s^{-1}$;

a calculation method of the dynamic loading strain rate of the load e in the process of crushing rocks with the target drill bit tooth is expressed as follows:

$$\dot{\varepsilon} = \frac{1.4 v_c \sin\gamma}{d \sin(\gamma + \omega)}$$

wherein $\dot{\varepsilon}$ is the dynamic loading strain rate of the load with a unit of $s^{-1}$; $v_c$ is the cutting tooth speed with a unit of mm/s; d is the cutting depth with a unit of mm; $\gamma$ is the caster angle of the target drill bit tooth with a unit of rad; $\omega$ is the scrap forming-compaction transition angle with a unit of rad.

A relationship between the average friction angle between the contact surfaces of the target drill bit tooth and the target rock and the caster angle of the target drill bit tooth is specifically expressed as follows:

$$\beta = e_1 \gamma + e_2$$

wherein $e_1$ and $e_2$ are the coefficients of the fitting formula, dimensionless; p is the average friction angle between the contact surfaces of the target drill bit tooth and the target rock with a unit of rad; $\gamma$ is the caster angle of the target drill bit tooth with a unit of rad.

The relationship between the average friction angle between the contact surfaces of the target drill bit tooth and the target rock and the caster angle of the target drill bit tooth is determined by steps of:

Step S31: using the SHPB for conducting n groups of rock-crushing experiments of the target drill bit tooth with different caster angles to obtain the horizontal cutting force and the vertical penetration force of the target drill bit tooth during the experiment, and using the processor for obtaining the average friction angle between the contact surfaces of the target drill bit tooth and the target rock according to the following formula:

$$\beta = \arctan\left(\frac{F_t}{F_c}\right) - \gamma$$

wherein $\beta$ is the average friction angle between the contact surfaces of the target drill bit tooth and the target rock with a unit of rad; $\gamma$ is the caster angle of the target drill bit tooth with a unit of rad; $F_t$ is the vertical penetration force of the target drill bit tooth with a unit of N; $F_c$ is the horizontal cutting force of the target drill bit tooth with a unit of N;

Step S32: using the processor for determining the relationship between the average friction angle between the contact surfaces of the target drill bit tooth and the target rock and the caster angle according to the fitting method.

A relationship between the scrap forming-compaction transition angle and the cutting depth is determined by n groups of rock-crushing experiments of the target drill bit tooth with different penetration depths and a regression method, which is expressed as follows:

$$\omega = k_1 d^n + k_2 d + k_3$$

wherein $k_1$, $k_2$, $k_3$ are the coefficients of the fitting formula, dimensionless; $\omega$ is the scrap forming-compaction transition angle with a unit of rad; d is the cutting depth with a unit of mm, and n is the number of groups of rock-crush experiments of the target drill bit tooth with penetration depths.

A calculation method of the target drill bit tooth penetration equivalent width is as follows:

$$w = \frac{R^2}{d} \arccos\left(\frac{R-d}{R}\right) - \frac{R-d}{d}\sqrt{R^2 - (R^2 - d^2)}$$

wherein R is the diameter of the cylindrical drill bit tooth with a unit of mm; w is the target drill bit tooth penetration equivalent width with a unit of mm; d is the cutting depth with a unit of mm.

The Invention has the Beneficial Effects:

The invention establishes a mechanical calculation method of drill bit tooth considering rock dynamic strength and mixed crushing mode. The invention fully considers the real mechanical state in the process of crushing rocks with the target drill bit tooth, as well as the rock dynamic strength, the mixed crushing mode, the target drill bit tooth movement speed, the target drill bit tooth shape and the rock strain rate, while overcoming the drawbacks that the existing analytical calculation methods of drill bit tooth force consider a single rock failure mode and only consider the static or quasi-static rock strength. The invention provides important guidance and support for drill bit design and development, drilling engineering parameter optimization, drill tool optimization or selection, ROP increasing, cost reduction and efficiency improvement. The invention has broad application prospects.

BRIEF DESCRIPTION OF THE DRAWINGS

Upon reading the following detailed description of preferred embodiments, various advantages and benefits will be apparent to those of ordinary skill in the art. The drawings are for the purpose of explaining preferred embodiments only, and do not constitute improper limitations on the present invention. The same components are also denoted by the same reference numerals throughout the drawings. In the drawings.

DESCRIPTION OF THE PREFERRED EMBODIMENTS

The invention will be further described below in conjunction with the accompanying drawings, and the protection scope of the invention is not limited to the following.

Embodiment 1

1. A mechanics calculation method of drill bit tooth considering rock dynamic strength and mixed crushing mode.

Figure 1:
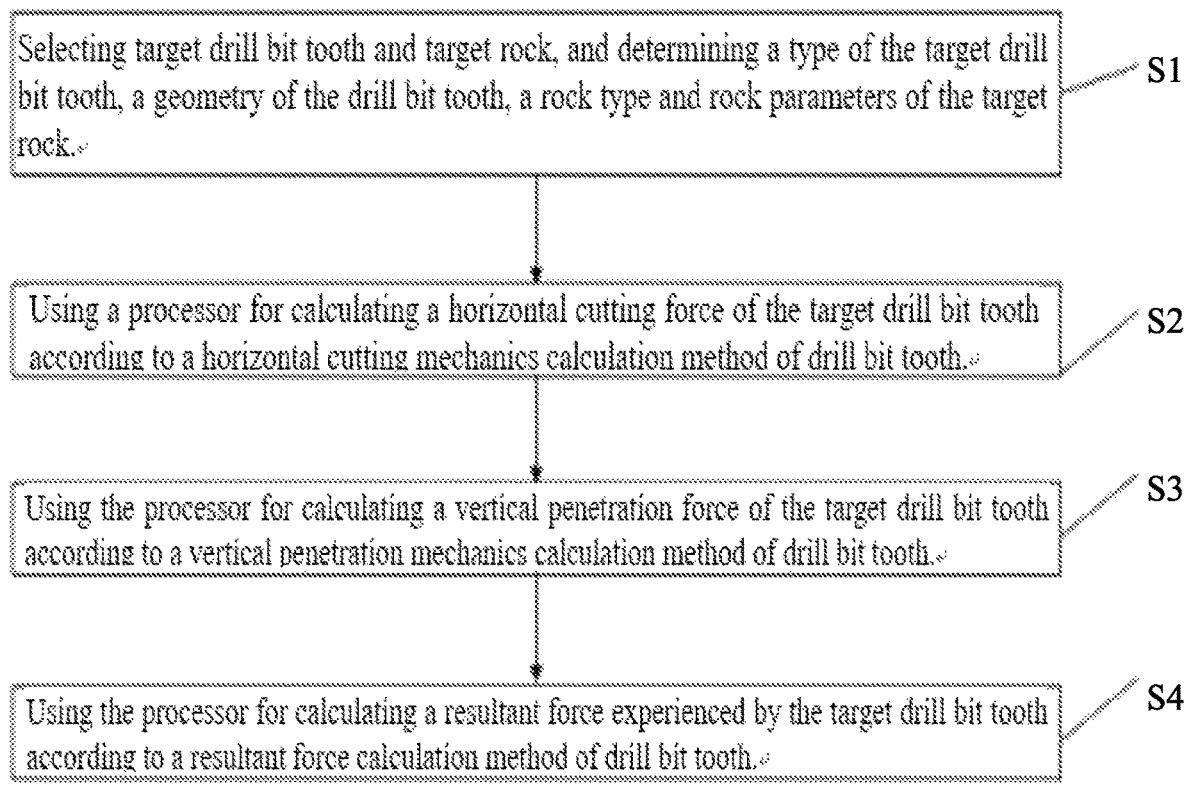
FIG. 1 is a flow chart of a mechanics calculation method of drill bit tooth considering rock dynamic strength and mixed crushing mode according to Embodiment 1 of the invention.
Figure 2:
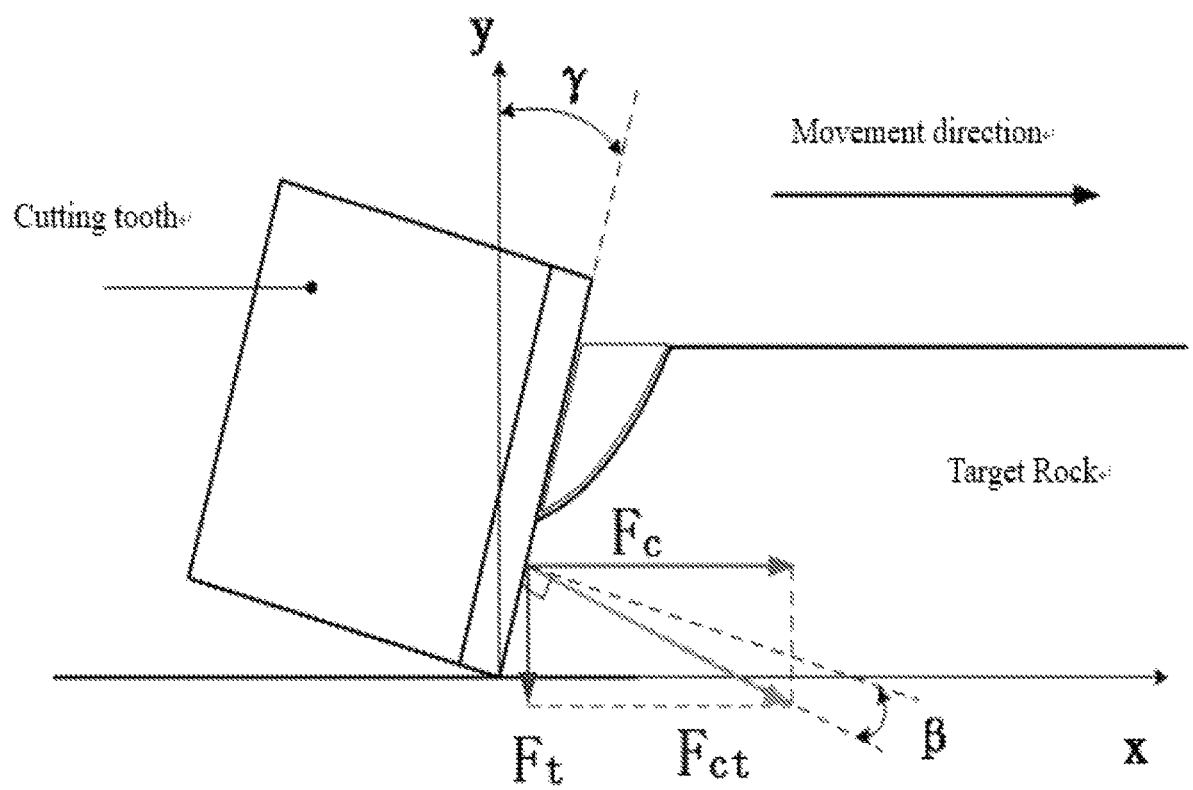
FIG. 2 is a schematic diagram of a relationship between a horizontal cutting force and a vertical penetration force according to Embodiment 1 of the invention.

As shown in FIGS. 1 and 2, a mechanics calculation method of drill bit tooth considering rock dynamic strength and mixed crushing mode includes the following steps:

Step S1: a target drill bit tooth and a target rock are selected, and a type of the target drill bit tooth, a geometry of the target drill bit tooth, a rock type and rock parameters of the target rock are determined;

Step S2: a horizontal cutting force of the target drill bit tooth is calculated according to a horizontal cutting mechanics calculation method of drill bit tooth;

Step S3: a vertical penetration force of the target drill bit tooth is calculated according to a vertical penetration mechanics calculation method of drill bit tooth;

Step S4: a resultant force experienced by the target drill bit tooth is calculated according to a resultant force calculation method of drill bit tooth.

In the Step S1, the type of the target drill bit tooth includes a cylindrical drill bit tooth and a wedge drill bit tooth; the geometry of the target drill bit tooth comprises a diameter of the cylindrical drill bit tooth, a height of the cylindrical drill bit tooth, a height of the wedge drill bit tooth, and an angle of the wedge drill bit tooth; the rock parameters comprise a static rock uniaxial compressive strength, a static rock tensile strength, a static rock shear strength, a rock internal friction angle, a dynamic rock uniaxial compressive strength, a dynamic rock tensile strength, and a dynamic rock shear strength.

In the Step S2, the horizontal cutting mechanics calculation method of drill bit tooth is determined according to the following formula:

$$F_c = F \times D \times \frac{A}{A \times E + C} + B$$

wherein:

$$A = \cos(\gamma + \omega) \times [H + I + J - K];$$

$$B = \frac{2\sigma_{sd} w d \sin\omega \cos\varphi \cos(\beta + \gamma)}{1 - \sin(\varphi + \gamma + \beta)};$$

$$C = \sin\omega \frac{\cos(\gamma + \omega) + G}{M};$$

$$D = \frac{\sin\left(\frac{\pi}{2} - \gamma\right)}{\sin\left(\frac{\pi}{2} - \gamma - \omega\right)};$$

$$E = \frac{\sin\omega}{\cos(\gamma + \omega)};$$

$$F = \sigma_{ucd} w d;$$

$$G = \sqrt{\cos^2(\gamma + \omega) + 4N\sin^2\left(\frac{\pi}{4} - \frac{\gamma + \omega}{2}\right) + 4\sin^4\left(\frac{\pi}{4} + \frac{\gamma + \omega}{2}\right)};$$

$$H = -\frac{\cos(\gamma + \omega)}{4\sin^2\left(\frac{\pi}{4} - \frac{\gamma + \omega}{2}\right) + 4N};$$

$$I = \frac{\sqrt{N+1}}{2\sin\left(\frac{\pi}{4} - \frac{\gamma + \omega}{2}\right)};$$

$$J = \frac{1}{2}\cot\left(\frac{\pi}{4} - \frac{\gamma + \omega}{2}\right);$$

$$K = \frac{G}{L};$$

$$L = 4\sin^2\left(\frac{\pi}{4} - \frac{\gamma + \omega}{2}\right) + 4N;$$

$$M = 2\sin^2\left(\frac{\pi}{4} + \frac{\gamma + \omega}{2}\right) + 2N;$$

$$N = \frac{\sigma_{td}}{\sigma_{ucd}};$$

wherein $F_c$ is the horizontal cutting force of the target drill bit tooth with a unit of N; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\gamma$ is the caster angle of the target drill bit tooth with a unit of rad; $\omega$ is the scrap forming-compaction transition angle with a unit of rad; $\beta$ is the average friction angle between contact surfaces of the target drill bit tooth and the target rock with a unit of rad; $\varphi$ is the rock internal friction angle, and w is the target drill bit tooth penetration equivalent width with a unit of mm; d is the cutting depth with a unit of mm.

In the Step S3, the vertical penetration mechanics calculation method of drill bit tooth is determined according to the following formula:

$$F_t = \tan(\gamma + \beta) F_c$$

wherein $F_t$ is the vertical penetration force of the target drill bit tooth with a unit of N; $\gamma$ is the caster angle of the target drill bit tooth with a unit of rad; $\beta$ is the average friction angle between contact surfaces of the target drill bit tooth and the target rock with a unit of rad; $F_c$ is the horizontal cutting force of the target drill bit tooth with a unit of N.

Furthermore, in the Step S4, the resultant force calculation method of drill bit tooth is determined according to the following formula:

$$F_{ct} = \sqrt{\left(F \times D \times \frac{A}{A \times E + C} + B\right)^2 + (\tan(\gamma + \beta) F_c)^2}$$

wherein:

$$A = \cos(\gamma + \omega) \times [H + I + J - K];$$

$$B = \frac{2\sigma_{sd} w d \sin\omega \cos\varphi \cos(\beta + \gamma)}{1 - \sin(\varphi + \gamma + \beta)};$$

$$C = \sin\omega \frac{\cos(\gamma + \omega) + G}{M};$$

$$D = \frac{\sin\left(\frac{\pi}{2} - \gamma\right)}{\sin\left(\frac{\pi}{2} - \gamma - \omega\right)};$$

$$E = \frac{\sin\omega}{\cos(\gamma + \omega)};$$

$$F = \sigma_{ucd} w d;$$

$$G = \sqrt{\cos^2(\gamma + \omega) + 4N\sin^2\left(\frac{\pi}{4} - \frac{\gamma + \omega}{2}\right) + 4\sin^4\left(\frac{\pi}{4} + \frac{\gamma + \omega}{2}\right)};$$

$$H = -\frac{\cos(\gamma + \omega)}{4\sin^2\left(\frac{\pi}{4} - \frac{\gamma + \omega}{2}\right) + 4N};$$

$$I = \frac{\sqrt{N+1}}{2\sin\left(\frac{\pi}{4} - \frac{\gamma + \omega}{2}\right)};$$

$$J = \frac{1}{2}\cot\left(\frac{\pi}{4} - \frac{\gamma + \omega}{2}\right);$$

$$K = \frac{G}{L};$$

$$L = 4\sin^2\left(\frac{\pi}{4} - \frac{\gamma + \omega}{2}\right) + 4N;$$

$$M = 2\sin^2\left(\frac{\pi}{4} + \frac{\gamma + \omega}{2}\right) + 2N;$$

$$N = \frac{\sigma_{td}}{\sigma_{ucd}};$$

wherein $F_c$ is the horizontal cutting force of the target drill bit tooth with a unit of N; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\gamma$ is the caster angle of the target drill bit tooth with a unit of rad; $\omega$ is the scrap forming-compaction transition angle with a unit of rad; $\beta$ is the average friction angle between contact surfaces of the target drill bit tooth and the target rock with a unit of rad; $\varphi$ is the rock internal friction angle, and w is the target drill bit tooth penetration equivalent width with a unit of mm; d is the cutting depth with a unit of mm; $F_{ct}$ is the resultant force of the target drill bit tooth with a unit of N.

The static rock uniaxial compressive strength, the static rock tensile strength, the static rock shear strength and the rock internal friction angle of the rock parameters are measured by field logging data or laboratory rock mechanics experiments; the dynamic rock uniaxial compressive strength, the dynamic rock tensile strength and the dynamic rock shear strength of the rock parameters are obtained according to steps of:

Step S11: the dynamic rock uniaxial compressive strength is measured by SHPB rock mechanics experiments, and a relationship is established among the dynamic rock uniaxial compressive strength, the static rock uniaxial compressive strength and a dynamic loading strain rate of the load, which is expressed as follows:

$$\frac{\sigma_{ucd}}{\sigma_{uc}} = \begin{cases} a_1 \dot{\varepsilon}^{1/(1+n_c)} (\dot{\varepsilon} < \dot{\varepsilon}^*) \\ a_2 \dot{\varepsilon}^{1/n} (\dot{\varepsilon} \geq \dot{\varepsilon}^*) \end{cases}$$

Step S12: the dynamic rock tensile strength is measured by SHPB rock mechanics experiments, the dynamic rock tensile strength being the radial fracturing indirect tensile strength, and a relationship is established among the dynamic rock tensile strength, the static rock tensile strength and the dynamic loading strain rate of the load, which is expressed as follows:

$$\frac{\sigma_{td}}{\sigma_t} = \begin{cases} b_1 \dot{\varepsilon}^{1/(1+n_c)} (\dot{\varepsilon} < \dot{\varepsilon}^*) \\ b_2 \dot{\varepsilon}^{1/n} (\dot{\varepsilon} \geq \dot{\varepsilon}^*) \end{cases}$$

Step S13: the dynamic rock shear strength is measured by SHPB rock mechanics experiments, and s relationship is established among the dynamic rock shear strength, the static rock shear strength and the dynamic loading strain rate of the load, which is expressed as follows:

$$\frac{\sigma_{sd}}{\sigma_s} = \begin{cases} c_1 \dot{\varepsilon}^{1/(1+n_c)} (\dot{\varepsilon} < \dot{\varepsilon}^*) \\ c_2 \dot{\varepsilon}^{1/n} (\dot{\varepsilon} \geq \dot{\varepsilon}^*) \end{cases}$$

wherein $a_1$, $a_2$, $b_1$, $b_2$, $c_1$, $c_2$, n, $n_c$ are the fit coefficients, dimensionless; $\sigma_{uc}$ is the static rock uniaxial compressive strength with a unit of MPa; $\sigma_t$ is the static rock tensile strength with a unit of MPa; $\sigma_s$ is the static rock shear strength with a unit of MPa; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\dot{\varepsilon}$ is the dynamic loading strain rate of the load with a unit of $s^{-1}$, and $\dot{\varepsilon}^*$ is the dynamic loading critical strain rate of the load with a unit of $s^{-1}$.

A calculation method of the dynamic loading strain rate of the load $\dot{\varepsilon}$ in the process of crushing rocks with the target drill bit tooth is expressed as follows:

$$\dot{\varepsilon} = \frac{1.4 v_c \sin\gamma}{d \sin(\gamma + \omega)}$$

wherein $\dot{\varepsilon}$ is the dynamic loading strain rate of the load with a unit of s−1; $v_c$ is the cutting tooth speed with a unit of mm/s; d is the cutting depth with a unit of mm; $\gamma$ is the caster angle of the target drill bit tooth with a unit of rad; $\omega$ is the scrap forming-compaction transition angle with a unit of rad.

A relationship between the average friction angle between the contact surfaces of the target drill bit tooth and the target rock and the caster angle of the target drill bit tooth is specifically expressed as follows:

$$\beta = e_1 \gamma + e_2$$

wherein $e_1$ and $e_2$ are the coefficients of the fitting formula above, dimensionless; $\beta$ is the average friction angle between the contact surfaces of the target drill bit tooth and the target rock with a unit of rad; $\gamma$ is the caster angle of the target drill bit tooth with a unit of rad.

The relationship between the average friction angle between the contact surfaces of the target drill bit tooth and the target rock and the caster angle of the target drill bit tooth may be determined by steps of:

Step S31: n groups of rock-crushing experiments of the target drill bit tooth with different caster angles are conducted to obtain the horizontal cutting force and vertical penetration force of the target drill bit tooth during the experiment, and the average friction angle between the contact surfaces of the target drill bit tooth and the target rock is obtained according to the following formula:

$$\beta = \arctan\left(\frac{F_t}{F_c}\right) - \gamma$$

wherein β is the average friction angle between the contact surfaces of the target drill bit tooth and the target rock with a unit of rad; γ is the caster angle of the target drill bit tooth with a unit of rad; $F_t$ is the vertical penetration force of the target drill bit tooth with a unit of N; $F_c$ is the horizontal cutting force of the target drill bit tooth with a unit of N;

Step S32: the relationship between the average friction angle between the contact surfaces of the target drill bit tooth and the target rock and the caster angle is determined according to the fitting method.

A relationship between the scrap forming-compaction transition angle and the cutting depth is determined by n groups of rock-crushing experiments of the target drill bit tooth with different penetration depths and a regression method, which is expressed as follows:

$$\omega = k_1 d^n + k_2 d + k_3$$

wherein $k_1$, $k_2$, $k_3$ are the coefficients of the fitting formula above, dimensionless; ω is the scrap forming-compaction transition angle with a unit of rad; d is the cutting depth with a unit of mm, and n is the number of groups of rock-crush experiments of the target drill bit tooth with penetration depths.

A calculation method of the target drill bit tooth penetration equivalent width is as follows:

$$w = \frac{R^2}{d}\arccos\left(\frac{R-d}{R}\right) - \frac{R-d}{d}\sqrt{R^2 - (R^2 - d^2)}$$

wherein R is the diameter of the cylindrical drill bit tooth with a unit of mm; w is the target drill bit tooth penetration equivalent width with a unit of mm; d is the cutting depth with a unit of mm.

The invention discloses a mechanics calculation method of drill bit tooth considering rock dynamic strength and mixed crushing mode. The calculation method includes: (1) a target drill bit tooth and a target rock are selected, and a type of the target drill bit tooth, a geometry of the target drill bit tooth, a rock type and rock parameters of the target rock are determined; (2) a horizontal cutting force of the target drill bit tooth is calculated according to a horizontal cutting mechanics calculation method of drill bit tooth; (3) a vertical penetration force of the target drill bit tooth is calculated according to a vertical penetration mechanics calculation method of drill bit tooth; (4) a resultant force experienced by the target drill bit tooth is calculated according to a resultant force calculation method of drill bit tooth. The invention discloses a mechanics calculation process of drill bit tooth considering the rock dynamic strength and the mixed crushing mode, which provides a calculation method that may accurately and quickly obtain the mechanics of drill bit tooth under different working conditions.

The invention establishes a mechanical calculation method of drill bit tooth considering the rock dynamic strength and the mixed crushing mode. The invention fully considers the real mechanical state in the process of crushing rocks with the target drill bit tooth, as well as the rock dynamic strength, the mixed crushing mode, the target drill bit tooth speed, the target drill bit tooth shape and the rock strain rate, while overcoming the drawbacks that the existing analytical calculation methods of drill bit tooth force consider a single rock failure mode and only consider the static or quasi-static rock strength. The invention provides important guidance and support for drill bit design and development, drilling engineering parameter optimization, drill tool optimization or selection, penetration speed increasing, cost reduction and efficiency improvement. The invention has broad application prospects.

So far, those skilled in the art realize that although embodiments of the invention have been shown and described in detail herein, numerous other variations or modifications consistent with the principles of the invention may be directly determined or derived from the disclosure without departing from the spirit and scope of the invention. Accordingly, the scope of the invention should be understood and deemed to cover all such other variations or modifications.

What is claimed is:

1. A mechanics calculation method of drill bit tooth considering rock dynamic strength and mixed crushing mode, comprising steps of:

Step S1: selecting a target drill bit tooth and a target rock, and determining a type of the target drill bit tooth, a geometry of the target drill bit tooth, a rock type and rock parameters of the target rock;

Step S2: using a processor for calculating a horizontal cutting force of the target drill bit tooth according to a horizontal cutting mechanics calculation method of drill bit tooth;

Step S3: using the processor for calculating a vertical penetration force of the target drill bit tooth according to a vertical penetration mechanics calculation method of drill bit tooth;

Step S4: using the processor for calculating a resultant force experienced by the target drill bit tooth according to a resultant force calculation method of drill bit tooth;

wherein in the Step S2, the horizontal cutting mechanics calculation method of drill bit tooth is determined according to the following formula:

$$F_c = F \times D \times \frac{A}{A \times E + C} + B$$

wherein:

$$A = \cos(\gamma + \omega) \times [H + I + 1 - K];$$

$$B = \frac{2\sigma_{sd} w d \sin\omega \cos\phi \cos(\beta + \gamma)}{1 - \sin(\phi + \gamma + \beta)};$$

$$C = \sin\omega \frac{\cos(\gamma + \omega) + G}{M};$$

-continued $$D = \frac{\sin\left(\frac{\pi}{2} - \gamma\right)}{\sin\left(\frac{\pi}{2} - \gamma - \omega\right)};$$

$$E = \frac{\sin\omega}{\cos(\gamma + \omega)};$$

$$F = \sigma_{ucd}wd;$$

$$G = \sqrt{\cos^2(\gamma + \omega) + 4N\sin^2\left(\frac{\pi}{4} - \frac{\gamma + \omega}{2}\right) + 4\sin^4\left(\frac{\pi}{4} + \frac{\gamma + \omega}{2}\right)};$$

$$H = -\frac{\cos(\gamma + \omega)}{4\sin^2\left(\frac{\pi}{4} - \frac{\gamma + \omega}{2}\right) + 4N};$$

$$I = \frac{\sqrt{N+1}}{2\sin\left(\frac{\pi}{4} - \frac{\gamma + \omega}{2}\right)};$$

$$J = \frac{1}{2}\cot\left(\frac{\pi}{4} - \frac{\gamma + \omega}{2}\right);$$

$$K = \frac{G}{L};$$

$$L = 4\sin^2\left(\frac{\pi}{4} - \frac{\gamma + \omega}{2}\right) + 4N;$$

$$M = 2\sin^2\left(\frac{\pi}{4} + \frac{\gamma + \omega}{2}\right) + 2N;$$

$$N = \frac{\sigma_{td}}{\sigma_{ucd}};$$

wherein $F_c$ is the horizontal cutting force of the target drill bit tooth with a unit of N; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; γ is the caster angle of the target drill bit tooth with a unit of rad; ω is the scrap forming-compaction transition angle with a unit of rad; β is the average friction angle between contact surfaces of the target drill bit tooth and the target rock with a unit of rad; φ is the rock internal friction angle, and w is the target drill bit tooth penetration equivalent width with a unit of mm; d is the cutting depth with a unit of mm; and wherein in the Step S3, the vertical penetration mechanics calculation method of drill bit tooth is determined according to the following formula:

$$F_t = \tan(\gamma + \beta)F_c$$

wherein $F_t$ is the vertical penetration force of the target drill bit tooth with a unit of N; γ is the caster angle of the target drill bit tooth with a unit of rad; β is the average friction angle between contact surfaces of the target drill bit tooth and the target rock with a unit of rad; $F_c$ is the horizontal cutting force of the target drill bit tooth with a unit of N;

wherein the mechanics calculation method of drill bit tooth considering rock dynamic strength and mixed crushing mode is applied to achieve ROP increasing, cost reduction and efficiency improvement by performing the mechanics calculation method of drill bit tooth through fully considering the real mechanical state in the process of crushing rocks with the target drill bit tooth, as well as the rock dynamic strength, the mixed crushing mode, the target drill bit tooth movement speed, the target drill bit tooth shape and the rock strain rate.

2. The mechanics calculation method of drill bit tooth considering rock dynamic strength and mixed crushing mode according to claim 1, wherein in the Step S1, the type of the target drill bit tooth comprises a cylindrical drill bit tooth and a wedge drill bit tooth; the geometry of the target drill bit tooth comprises a diameter of the cylindrical drill bit tooth, a height of the cylindrical drill bit tooth, a height of the wedge drill bit tooth, and an angle of the wedge drill bit tooth; the rock parameters comprise a static rock uniaxial compressive strength, a static rock tensile strength, a static rock shear strength, a rock internal friction angle, a dynamic rock uniaxial compressive strength, a dynamic rock tensile strength, and a dynamic rock shear strength.

3. The mechanics calculation method of drill bit tooth considering rock dynamic strength and mixed crushing mode according to claim 1, wherein in the Step S4, the resultant force calculation method of drill bit tooth is determined according to the following formula:

$$F_{ct} = \sqrt{\left(F \times D \times \frac{A}{A \times E + C} + B\right)^2 + (\tan(\gamma + \beta)F_c)^2}$$

wherein:

$$A = \cos(\gamma + \omega) \times [H + I + 1 - K];$$

$$B = \frac{2\sigma_{sd}wd\sin\omega\cos\phi\cos(\beta + \gamma)}{1 - \sin(\phi + \gamma + \beta)};$$

$$C = \sin\omega\frac{\cos(\gamma + \omega) + G}{M};$$

$$D = \frac{\sin\left(\frac{\pi}{2} - \gamma\right)}{\sin\left(\frac{\pi}{2} - \gamma - \omega\right)};$$

$$E = \frac{\sin\omega}{\cos(\gamma + \omega)};$$

$$F = \sigma_{ucd}wd;$$

$$G = \sqrt{\cos^2(\gamma + \omega) + 4N\sin^2\left(\frac{\pi}{4} - \frac{\gamma + \omega}{2}\right) + 4\sin^4\left(\frac{\pi}{4} + \frac{\gamma + \omega}{2}\right)};$$

$$H = -\frac{\cos(\gamma + \omega)}{4\sin^2\left(\frac{\pi}{4} - \frac{\gamma + \omega}{2}\right) + 4N};$$

$$I = \frac{\sqrt{N+1}}{2\sin\left(\frac{\pi}{4} - \frac{\gamma + \omega}{2}\right)};$$

$$J = \frac{1}{2}\cot\left(\frac{\pi}{4} - \frac{\gamma + \omega}{2}\right);$$

$$K = \frac{G}{L};$$

$$L = 4\sin^2\left(\frac{\pi}{4} - \frac{\gamma + \omega}{2}\right) + 4N;$$

$$M = 2\sin^2\left(\frac{\pi}{4} + \frac{\gamma + \omega}{2}\right) + 2N;$$

$$N = \frac{\sigma_{td}}{\sigma_{ucd}};$$

wherein $F_c$ is the horizontal cutting force of the target drill bit tooth with a unit of N; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; γ is the caster angle of the target drill bit tooth with a unit of rad; ω is the scrap forming-compaction transition angle with a unit of rad; β is the average friction angle between contact surfaces of the target drill bit tooth and the target rock with a unit of rad; φ is the rock internal friction angle, and w is the target drill bit tooth penetration equivalent width with a unit of mm; d is the cutting depth with a unit of mm; $F_{ct}$ is the resultant force of the target drill bit tooth with a unit of N.

4. The mechanics calculation method of drill bit tooth considering rock dynamic strength and mixed crushing mode according to claim 2, wherein the static rock uniaxial compressive strength, the static rock tensile strength, the static rock shear strength and the rock internal friction angle of the rock parameters are measured by field logging data or laboratory rock mechanics experiments; the dynamic rock uniaxial compressive strength, the dynamic rock tensile strength and the dynamic rock shear strength of the rock parameters are obtained according to steps of:

Step S11: using a SHPB for measuring the dynamic rock uniaxial compressive strength by SHPB rock mechanics experiments, and using the processor for establishing a relationship among the dynamic rock uniaxial compressive strength, the static rock uniaxial compressive strength and a dynamic loading strain rate of the load, which is expressed as follows:

$$\frac{\sigma_{ucd}}{\sigma_{uc}} = \begin{cases} a_1 \dot{\varepsilon}^{1/(1+n_c)} (\dot{\varepsilon} < \dot{\varepsilon}^*) \\ a_2 \dot{\varepsilon}^{1/n} (\dot{\varepsilon} \geq \dot{\varepsilon}^*) \end{cases}$$

Step S12: using the SHPB for measuring the dynamic rock tensile strength by the SHPB rock mechanics experiments, the dynamic rock tensile strength being the radial fracturing indirect tensile strength, and using the processor for establishing a relationship among the dynamic rock tensile strength, the static rock tensile strength and the dynamic loading strain rate of the load, which is expressed as follows:

$$\frac{\sigma_{td}}{\sigma_t} = \begin{cases} b_1 \dot{\varepsilon}^{1/(1+n_c)} (\dot{\varepsilon} < \dot{\varepsilon}^*) \\ b_2 \dot{\varepsilon}^{1/n} (\dot{\varepsilon} \geq \dot{\varepsilon}^*) \end{cases}$$

Step S13: using the SHPB for measuring the dynamic rock shear strength by the SHPB rock mechanics experiments, and using the processor for establishing a relationship among the dynamic rock shear strength, the static rock shear strength and the dynamic loading strain rate of the load, which is expressed as follows:

$$\frac{\sigma_{sd}}{\sigma_s} = \begin{cases} c_1 \dot{\varepsilon}^{1/(1+n_c)} (\dot{\varepsilon} < \dot{\varepsilon}^*) \\ c_2 \dot{\varepsilon}^{1/n} (\dot{\varepsilon} \geq \dot{\varepsilon}^*) \end{cases}$$

wherein $a_1$, $a_2$, $b_1$, $b_2$, $c_1$, $c_2$, n, $n_c$ are the fit coefficients, dimensionless; $\sigma_{uc}$ is the static rock uniaxial compressive strength with a unit of MPa; $\sigma_t$ is the static rock tensile strength with a unit of MPa; $\sigma_s$ is the static rock shear strength with a unit of MPa; $\sigma_{ucd}$ is the dynamic rock uniaxial compressive strength with a unit of MPa; $\sigma_{td}$ is the dynamic rock tensile strength with a unit of MPa; $\sigma_{sd}$ is the dynamic rock shear strength with a unit of MPa; $\dot{\varepsilon}$ is the dynamic loading strain rate of the load with a unit of s$^{-1}$, and $\dot{\varepsilon}^*$ is the dynamic loading critical strain rate of the load with a unit of s$^{-1}$;

a calculation method of the dynamic loading strain rate of the load $\dot{\varepsilon}$ in the process of crushing rocks with the target drill bit tooth is expressed as follows:

$$\dot{\varepsilon} = \frac{1.4 v_c \sin\gamma}{d \sin(\gamma + \omega)}$$

wherein $\dot{\varepsilon}$ is the dynamic loading strain rate of the load with a unit of s$^{-1}$; $v_c$ is the cutting tooth speed with a unit of mm/s; d is the cutting depth with a unit of mm; $\gamma$ is the caster angle of the target drill bit tooth with a unit of rad; $\omega$ is the scrap forming-compaction transition angle with a unit of rad.

5. The mechanics calculation method of drill bit tooth considering rock dynamic strength and mixed crushing mode according to claim 1, wherein a relationship between the average friction angle between the contact surfaces of the target drill bit tooth and the target rock and the caster angle of the target drill bit tooth is specifically expressed as follows:

$$\beta = e_1 \gamma + e_2$$

wherein $e_1$ and $e_2$ are the coefficients of the fitting formula, dimensionless; $\beta$ is the average friction angle between the contact surfaces of the target drill bit tooth and the target rock with a unit of rad; $\gamma$ is the caster angle of the target drill bit tooth with a unit of rad.

6. The mechanics calculation method of drill bit tooth considering rock dynamic strength and mixed crushing mode according to claim 5, wherein the relationship between the average friction angle between the contact surfaces of the target drill bit tooth and the target rock and the caster angle of the target drill bit tooth is determined by steps of:

Step S31: using the SHPB for conducting n groups of rock-crushing experiments of the target drill bit tooth with different caster angles to obtain the horizontal cutting force and the vertical penetration force of the target drill bit tooth during the experiment, and using the processor for obtaining the average friction angle between the contact surfaces of the target drill bit tooth and the target rock according to the following formula:

$$\beta = \arctan\left(\frac{F_t}{F_c}\right) - \gamma$$

wherein $\beta$ is the average friction angle between the contact surfaces of the target drill bit tooth and the target rock with a unit of rad; $\gamma$ is the caster angle of the target drill bit tooth with a unit of rad; $F_t$ is the vertical penetration force of the target drill bit tooth with a unit of N; $F_c$ is the horizontal cutting force of the target drill bit tooth with a unit of N;

Step S32: using the processor for determining the relationship between the average friction angle between the contact surfaces of the target drill bit tooth and the target rock and the caster angle according to the fitting method.

7. The mechanics calculation method of drill bit tooth considering rock dynamic strength and mixed crushing mode according to claim 1, wherein a relationship between the scrap forming-compaction transition angle and the cutting depth is determined by n groups of rock-crushing experiments of the target drill bit tooth with different penetration depths and a regression method, which is expressed as follows:

$$\omega = k_1 d^n + k_2 d + k_3$$

wherein $k_1$, $k_2$, $k_3$ are the coefficients of the fitting formula, dimensionless; $\omega$ is the scrap forming-compaction transition angle with a unit of rad; d is the cutting depth with a unit of mm, and n is the number of groups of rock-crush experiments of the target drill bit tooth with penetration depths.

8. The mechanics calculation method of drill bit tooth considering rock dynamic strength and mixed crushing mode according to claim 1, wherein a calculation method of the target drill bit tooth penetration equivalent width is as follows:

$$w = \frac{R^2}{d}\arccos\left(\frac{R-d}{R}\right) - \frac{R-d}{d}\sqrt{R^2 - (R^2 - d^2)}$$

wherein R is the diameter of the cylindrical drill bit tooth with a unit of mm; w is the target drill bit tooth penetration equivalent width with a unit of mm; d is the cutting depth with a unit of mm.

* * * * *